US012681511B2

(12) United States Patent (10) Patent No.: US 12,681,511 B2
Campbell (45) Date of Patent: Jul. 14, 2026

(54) COOLER BYPASS MANIFOLD, METHOD FOR MODIFYING COOLER BYPASS MANIFOLD AND KIT FOR MODIFYING COOLER BYPASS MANIFOLD

(71) Applicant: Sonnax Transmission Company, Bellows Falls, VT (US)

(72) Inventor: Mackenzie M. Campbell, Chester, VT (US)

(73) Assignee: Sonnax Transmission Company, Bellows Falls, VT (US)

( * ) Notice: Subject to any disclaimer, the term of this patent is extended or adjusted under 35 U.S.C. 154(b) by 0 days.

(21) Appl. No.: 17/507,040

(22) Filed: Oct. 21, 2021

(65) Prior Publication Data

US 2022/0137653 A1 May 5, 2022

Related U.S. Application Data

(60) Provisional application No. 63/166,053, filed on Mar. 25, 2021, provisional application No. 63/107,251, filed on Oct. 29, 2020.

(51) Int. Cl.
*G05D 23/12* (2006.01)
*F16H 57/04* (2010.01)

(52) U.S. Cl.
CPC ....... *G05D 23/122* (2013.01); *F16H 57/0413* (2013.01); *G05D 23/123* (2013.01)

(58) Field of Classification Search
CPC . G05D 23/122; G05D 23/123; F16H 57/0413
USPC ....................................................... 137/15.19
See application file for complete search history.

(56) References Cited

U.S. PATENT DOCUMENTS

| | | | | | |
|---|---|---|---|---|---|
| 2,749,043 | A | * | 6/1956 | Eskin ................... | G05D 23/122 |
| | | | | | 236/48 R |
| 3,300,135 | A | * | 1/1967 | Slater ..................... | F16N 39/02 |
| | | | | | 236/92 R |
| 11,725,891 | B2 | | 8/2023 | Mason | |
| 2003/0136855 | A1 | * | 7/2003 | Brown ............... | G05D 23/1333 |
| | | | | | 236/34.5 |
| 2004/0232249 | A1 | * | 11/2004 | Brown ................... | F16H 57/04 |
| | | | | | 236/34.5 |
| 2010/0126594 | A1 | * | 5/2010 | Sheppard ................. | F01P 7/16 |
| | | | | | 137/340 |
| 2019/0107037 | A1 | * | 4/2019 | Qiu ..................... | G05D 23/025 |

* cited by examiner

*Primary Examiner* — Lindsay M Low
*Assistant Examiner* — Omar Morales
(74) *Attorney, Agent, or Firm* — ANDRUS INTELLECTUAL PROPERTY LAW, LLP

(57) ABSTRACT

A modified cooler bypass manifold includes a manifold body having an inlet conduit, an outlet conduit, a return conduit, a thermal valve bore, a pressure valve bore and an intermediate conduit. A plug may be installed in the thermal valve bore. In another embodiment, a modified cooler bypass manifold includes an OE manifold body, a first inlet conduit, a second inlet conduit, a first outlet conduit, a second outlet conduit and a valve bore. The modified cooler bypass manifold may also include a pressure bypass valve assembly disposed in the valve bore. An OE end cap and retaining ring may be disposed in the valve bore and operably connected to the pressure bypass valve assembly and the OE manifold body.

10 Claims, 11 Drawing Sheets

500

Removing OE Thermal Bypass Valve Assembly from Thermal Valve Bore ~510

Threading at least a Portion of Thermal Valve Bore ~520

Installing Plug in Thermal Valve Bore ~530

Securing Plug in Thermal Valve Bore ~540

COOLER BYPASS MANIFOLD, METHOD FOR MODIFYING COOLER BYPASS MANIFOLD AND KIT FOR MODIFYING COOLER BYPASS MANIFOLD

CROSS-REFERENCE TO RELATED APPLICATION DATA

This application claims the benefit of and priority to U.S. Provisional Patent Application Ser. No. 63/107,251, filed Oct. 29, 2020, titled "COOLER BYPASS MANIFOLD, METHOD FOR MODIFYING COOLER BYPASS MANIFOLD AND KIT FOR MODIFYING COOLER BYPASS MANIFOLD" and U.S. Provisional Patent Application Ser. No. 63/166,053, filed Mar. 25, 2021, titled "COOLER BYPASS MANIFOLD, METHOD FOR MODIFYING COOLER BYPASS MANIFOLD AND KIT FOR MODIFYING COOLER BYPASS MANIFOLD", the disclosures of which are incorporated herein in their entireties.

BACKGROUND

The following description relates generally to a cooler bypass manifold for an automatic transmission, for example, a modified cooler bypass manifold, a method for modifying an OE cooler bypass manifold and a kit for modifying an OE cooler bypass manifold.

An automatic transmission for a vehicle is frequently equipped with a cooler bypass manifold for directing automatic transmission fluid (ATF) between a transmission case and a cooler. The cooler bypass manifold may be included with the automatic transmission by the vehicle manufacturer as an original equipment (OE) part. Original equipment, or "OE," parts are those parts installed in the vehicle by the original manufacturer during original assembly of the vehicle. OE parts and sub-parts referenced herein may be prefaced with the "OE" terminology.

A typical OE cooler bypass manifold is formed as a block of aluminum with multiple internal ATF passages and multiple external fittings for connection to the transmission case and the cooler. The OE cooler bypass manifold houses a thermal bypass valve assembly for selectively directing ATF flow through the manifold between the transmission case and the cooler based on an ATF temperature. In a particular OE cooler bypass manifold, as shown in FIG. 2, the OE cooler bypass manifold may house a pressure bypass valve assembly 150 in parallel with the thermal bypass valve assembly 130. In another OE cooler bypass manifold, as shown in FIG. 6, the thermal bypass valve assembly 630 is the only valve housed in the OE cooler bypass manifold.

At unsuitably low temperatures, ATF may become too viscous. Cold, thick ATF may cause lube related transmission failure. Conversely, unsuitably high ATF temperatures may lead to insufficient lubrication and/or overheating in the automatic transmission.

In relatively cold weather climates, an initial ATF temperature may be relatively low. Accordingly, the thermal bypass valve assembly of the OE cooler bypass manifold can be operated to return ATF directly to the transmission case, thereby bypassing the cooler, to increase ATF temperature to a manufacturer-determined set point temperature. Upon reaching the set point temperature, the thermal bypass valve assembly can be operated to direct ATF to the cooler to avoid unsuitably high ATF temperatures. However, if the thermal bypass valve assembly fails in a position where ATF is directed to the cooler, ATF temperature may become unsuitably low.

Conversely, in relatively warm weather climates, an initial ATF temperature may be relatively high. The thermal bypass valve assembly can be operated to direct ATF to the cooler to remove heat and avoid unsuitably high ATF temperatures. However, if the thermal bypass valve assembly fails in a bypass position, where ATF flow is not permitted to the cooler, the ATF temperature may become unsuitably high.

Thus, in relatively warm weather climates, technicians have sought to intentionally block or remove the thermal bypass valve assembly from OE cooler bypass manifolds so that ATF is continuously directed to the cooler. In some instances, technicians have sought to replace the thermal bypass valve assembly with a non-OE pressure bypass valve assembly. The non-OE pressure bypass valve assembly may allow for continued operation of the transmission in the event ATF flow between the OE cooler bypass manifold and the cooler (including within the cooler itself) becomes restricted, so long as the ATF temperature remains below an unsuitably high temperature. That is, in the event of ATF flow restriction to or within the cooler, the non-OE pressure bypass valve assembly may be operated to direct ATF back to the transmission case, thereby bypassing the cooler.

However, elimination of the OE thermal bypass valve assembly from the OE cooler bypass manifold generally requires an individual technician to apply their own skill and knowledge to affect to a solution. Thus, such attempted solutions often have varying degrees of success because, for example, the solution may be difficult to consistently reproduce by technicians, which may lead to results which are inconsistent or difficult to be reliably reproduced. The attempted solutions may also be time consuming to develop, and thus, may not be cost effective for the technician. Vehicle maintenance may become difficult with non-standard solutions as well.

Accordingly, it is desirable to provide a modified cooler bypass manifold for an automatic transmission, a method of modifying an OE cooler bypass manifold and a kit for modifying an OE cooler bypass which can be quickly and easily installed, can provide effective and reproducible results and is relatively inexpensive.

SUMMARY

According to an embodiment, a modified cooler bypass manifold may include a manifold body having an inlet conduit, an outlet conduit, a return conduit, a thermal valve bore, a pressure valve bore and an intermediate conduit. The modified cooler bypass manifold may further include a plug installed in the thermal valve bore.

In embodiments, the thermal valve bore may include a threaded portion and the plug may include a threaded portion configured to engage the threaded portion of the thermal valve bore. The plug may be a one-piece construction. The thermal valve bore may be configured to receive automatic transmission fluid from the inlet conduit, and the plug may be configured to direct the automatic transmission fluid to the pressure valve bore. The modified cooler bypass manifold may further include an OE pressure bypass valve assembly disposed in the pressure valve bore.

According to another embodiment, a method of modifying an OE cooler bypass manifold may include removing an OE thermal bypass valve assembly from a thermal valve bore of the manifold body, threading at least a portion of the thermal valve bore, and installing a plug in the thermal valve bore.

In embodiments, the method may further include securing the plug in the thermal valve bore. The plug may include a threaded portion and installing the plug may include engaging the threaded portion of the plug with a threaded portion of the thermal valve bore. The plug may be a one-piece construction. The thermal valve bore may be configured to receive automatic transmission fluid from the inlet conduit, and the plug may be configured to direct the automatic transmission fluid to pressure valve bore.

According to another embodiment, a kit for modifying an OE cooler bypass manifold includes a plug formed as a one-piece construction, the plug having a head, a rod, a foot and a threaded portion formed on the foot. The plug is configured for installation in a thermal valve bore of the OE cooler bypass manifold.

According to another embodiment, a modified cooler bypass manifold includes an OE manifold body, a first inlet conduit, a second inlet conduit, a first outlet conduit, a second outlet conduit and a valve bore. The modified cooler bypass manifold further includes a pressure bypass valve assembly disposed in the valve bore and an OE end cap and retaining ring disposed in the valve bore and operably connected to the pressure bypass valve assembly and the OE manifold body.

In embodiments, the pressure bypass valve assembly may include a sleeve, a pressure activated valve at least partially disposed within the sleeve, and one or more valve springs to urge the pressure activated valve toward a second end of the valve bore. The pressure bypass valve assembly may be operable to direct automatic transmission fluid received in the first inlet conduit to the second outlet conduit or to the valve bore and first outlet conduit based on a fluid pressure of the automatic transmission fluid.

According to another embodiment, a method for modifying an OE cooler bypass manifold includes removing the OE thermal bypass valve assembly from the valve bore, installing a pressure bypass valve assembly in the valve bore, and securing the pressure bypass valve assembly in the valve bore.

In an embodiment, the OE thermal bypass valve assembly comprises an OE end cap and retaining ring, and securing the pressure bypass valve assembly in the valve bore further includes operably connecting the OE end cap and retaining ring to the pressure bypass valve assembly and the OE manifold body, wherein the OE end cap retaining ring is disposed at least partially in the valve bore.

According to an embodiment, a kit for modifying an OE cooler bypass manifold includes a pressure bypass valve assembly having a sleeve, a pressure activated valve, and a spring. The pressure bypass valve assembly is configured for installation in the valve bore.

Other objects, features, and advantages of the disclosure will be apparent from the following description, taken in conjunction with the accompanying sheets of drawings, wherein like numerals refer to like parts, elements, components, steps, and processes.

DETAILED DESCRIPTION

Figure 1:
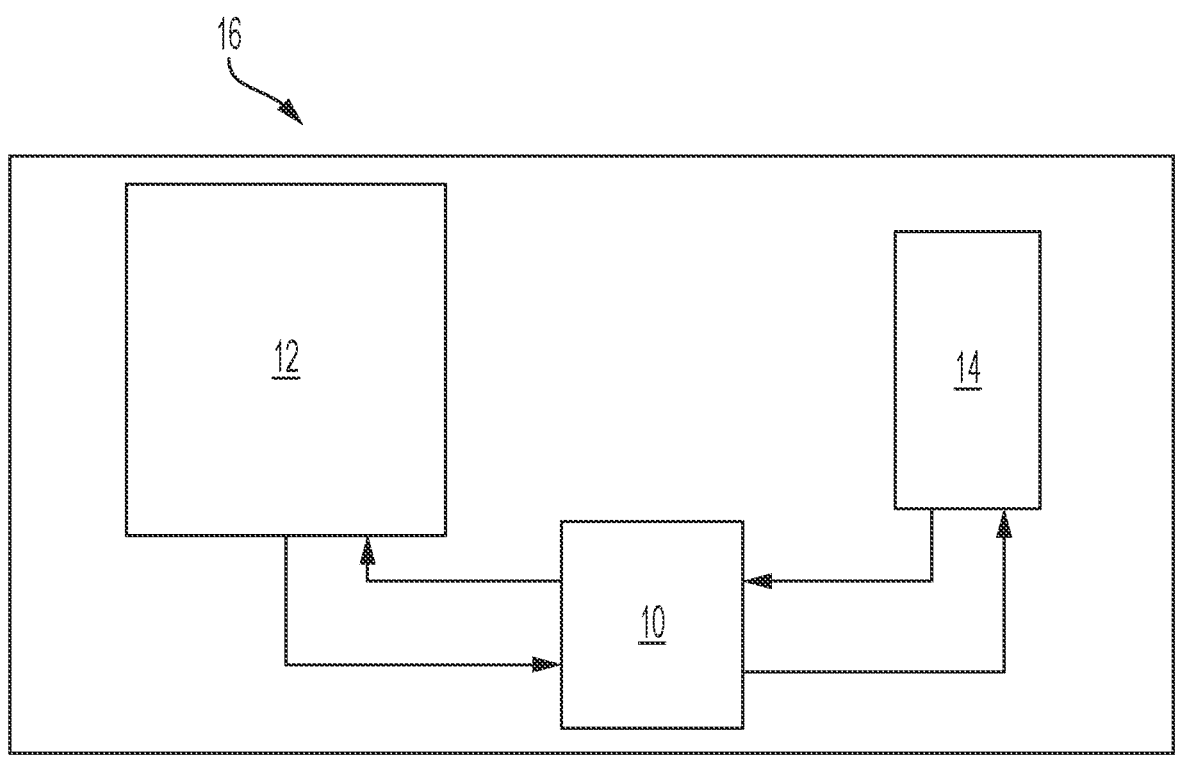
FIG. 1 is a block diagram schematically illustrating an environment in which a modified cooler bypass manifold may be implemented, according to an embodiment.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

FIG. 1 is a block diagram schematically illustrating an environment in which a modified cooler bypass manifold 10 may be implemented, according to an embodiment. According to embodiments herein, the modified bypass cooler manifold 10 is configured to control fluid flow between a transmission case 12 and a cooler 14 of an automatic transmission 16 of a vehicle. Automatic transmission fluid flow is indicated by the arrows.

In example implementations, the modified cooler bypass manifold of the present embodiments may include an OE cooler bypass manifold body from which an OE thermal bypass valve assembly has been removed and replaced with either a plug or a pressure bypass valve assembly of the present embodiments.

Figure 2:
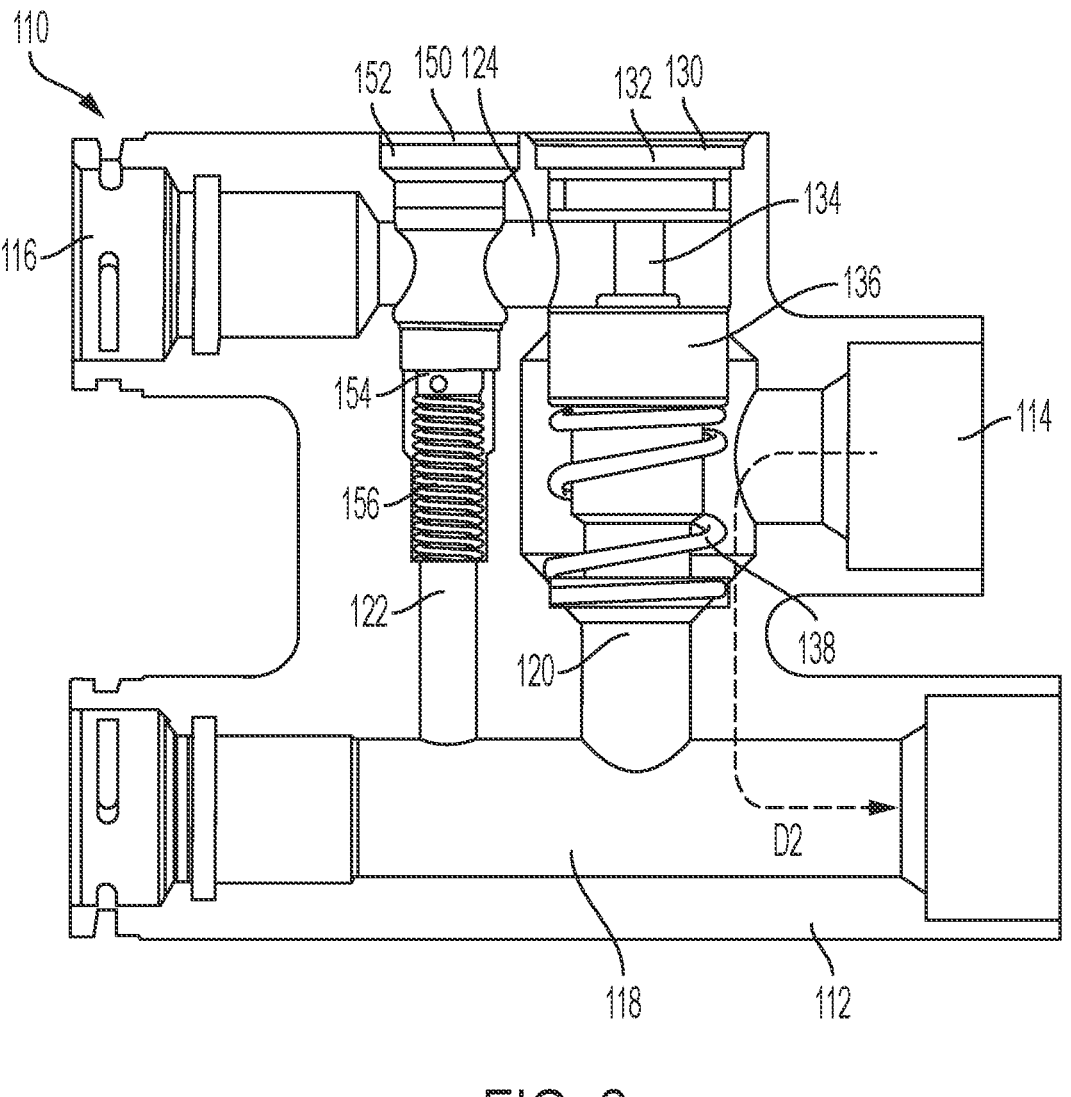
FIG. 2 is a sectional view illustrating a prior art OE cooler bypass manifold.

For example, in an embodiment, the OE cooler bypass manifold includes an OE thermal bypass valve assembly 130 installed in a thermal valve bore and an OE pressure bypass valve assembly 150 installed in a pressure valve bore, as shown in FIG. 2. According to embodiments herein, the OE thermal bypass valve assembly 130 may be removed from the thermal valve bore (see FIG. 3) and replaced with the plug 430 (see FIG. 4) of the present embodiments. Accordingly, in an embodiment, the modified cooler bypass manifold may include the plug 430 installed in the thermal valve bore of the OE cooler bypass manifold body instead of the OE thermal bypass valve assembly 130. A method of modifying the OE cooler bypass manifold according to embodiments herein may include removing the OE thermal bypass valve assembly 130 from the OE cooler bypass manifold body and installing the plug 430 in the thermal valve bore of the OE cooler bypass manifold body. A kit for modifying the OE cooler bypass manifold according to embodiments herein may include the plug 430.

Figure 6:
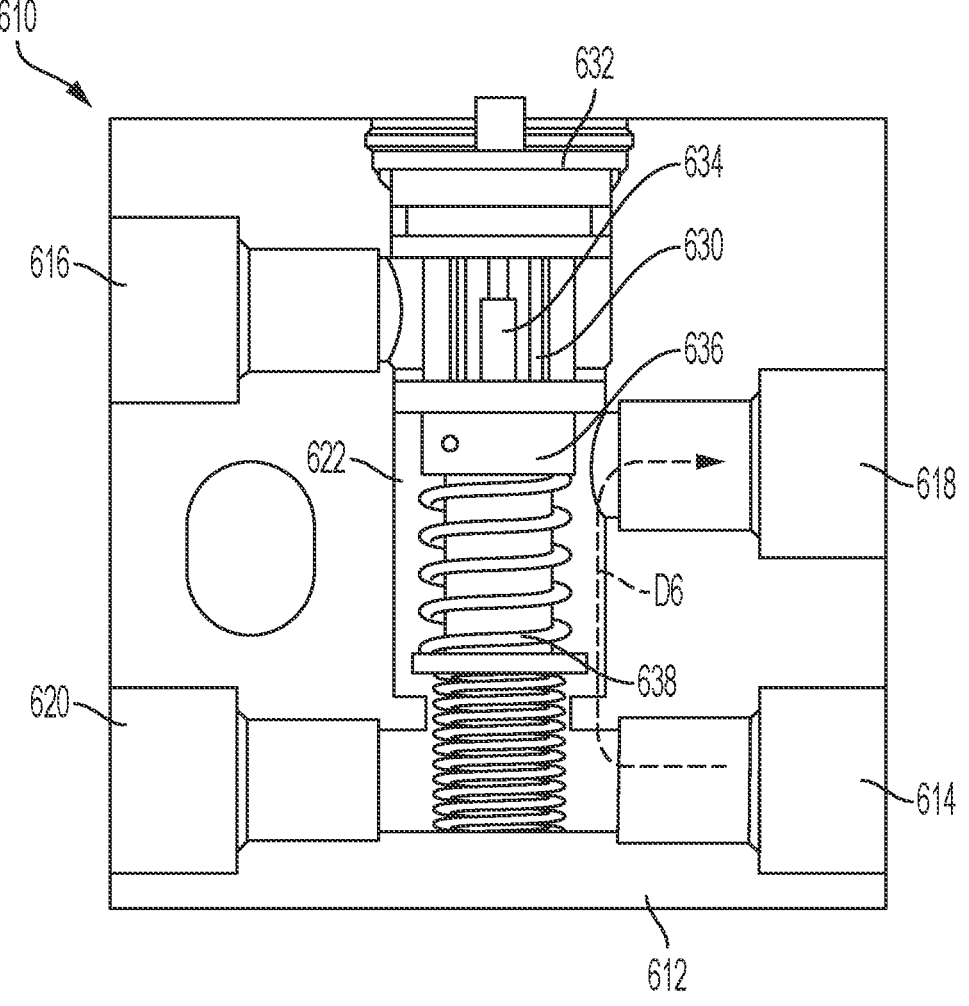
FIG. 6 is a sectional view illustrating another prior art OE cooler bypass manifold.

In another embodiment, the OE cooler bypass manifold body includes only a single valve bore for an OE thermal bypass valve assembly 630, as shown in FIG. 6. According to embodiments herein, the OE thermal bypass valve assembly 630 may be removed from the valve bore (see FIG. 7) and replaced with the pressure bypass valve assembly 830 (see FIG. 8) of the present embodiments. Accordingly, the modified cooler bypass manifold of the present embodiments may include the pressure bypass valve assembly 830 installed in the valve bore of the OE cooler bypass manifold body instead of the OE thermal bypass valve assembly 630. A method of modifying the OE cooler bypass manifold according to embodiments herein may include removing the OE thermal bypass valve assembly 630 from the OE cooler bypass manifold body and installing the pressure bypass valve assembly 830 in the valve bore of the OE cooler bypass manifold body. A kit for modifying the OE cooler bypass manifold according to embodiments herein may include the pressure bypass valve assembly 830.

FIG. 2 is a sectional diagram illustrating a prior art OE cooler bypass manifold 110. The OE cooler bypass manifold 110 includes an OE manifold body 112. The OE manifold body 112 includes an inlet conduit 114 configured to receive automatic transmission fluid (ATF) from a transmission case, an outlet conduit 116 configured to discharge ATF to a cooler and a return conduit 118 configured to return ATF to the transmission case.

The OE manifold body 112 further includes a thermal valve bore 120 and a pressure valve bore 122. The thermal valve bore 120 is connected to an extends between the inlet conduit 114 and the return conduit 118. The pressure valve bore 122 is connected to and extends between the outlet conduit 116 and the return conduit 118. The pressure valve bore 122 is connected to the return conduit 118 upstream from the thermal valve bore 120 in a direction of flow from the cooler to the transmission case. The thermal valve bore 120 and the pressure valve bore 122 are connected by an intermediate conduit 124.

An OE thermal bypass valve assembly 130 is disposed in the thermal valve bore 120. The OE thermal bypass valve assembly 130 includes an end cap 132 seated in the bore 120, a wax motor pin 134 connected to the end cap 132, a wax motor body 136 connected to the wax motor pin 134, and a thermal valve spring 138 operably connected to the wax motor body 136. The wax motor pin 134 is configured to move the wax motor body 136 against a biasing force of the thermal valve spring 138 in response to a predetermined ATF temperature. An O-ring (not shown) is provided around the end cap 132 to seal an end of the thermal valve bore 120.

An OE pressure bypass valve assembly 150 is disposed in the pressure valve bore 122. The OE pressure bypass valve assembly 150 includes an end cap 152 seated in the bore 122, a check-ball pressure activated valve 154 and a pressure valve spring 156 configured to urge the check-ball pressure activated valve 154 in a predetermined direction. An O-ring is provided around the end cap 152 to seal an end of the pressure valve bore 122.

ATF is received by the inlet conduit 114 of the OE cooler bypass manifold 110 from the transmission case. When ATF temperature is relatively low, the wax motor body 136 of the OE thermal bypass valve assembly 130 is positioned to direct ATF from the inlet conduit 114, through the thermal valve bore 120, and to the return conduit 118 along direct return flow path D2. ATF is then returned to the transmission case. When ATF temperature is relatively high, the wax motor pin 134 positions the wax motor body 136 such that ATF from the inlet conduit 114 flows to the intermediate conduit 124 via the thermal valve bore 120. ATF flows from the intermediate conduit 124 to the outlet conduit 116 via the pressure valve bore 122, and from the outlet conduit 116 to the cooler. ATF may be returned from the cooler to the transmission case via the OE cooler bypass manifold 110 through the return conduit 118.

The pressure activated valve 154, under a biasing force of the pressure valve spring 156, is urged to a position at which ATF is substantially prevented from flowing through the pressure valve bore 122. That is, the pressure activated valve 154 is normally positioned to direct ATF to the cooler. In the event of ATF pressure increase beyond a pressure threshold value, the pressure activated valve 154 is moved to a position at which ATF is directed through the pressure valve bore 122 to the return conduit 118, for return to the transmission case. In this manner, the pressure activated valve 154 may cause ATF to bypass the cooler, for example, when flow to, from or through the cooler is restricted.

Figure 3:
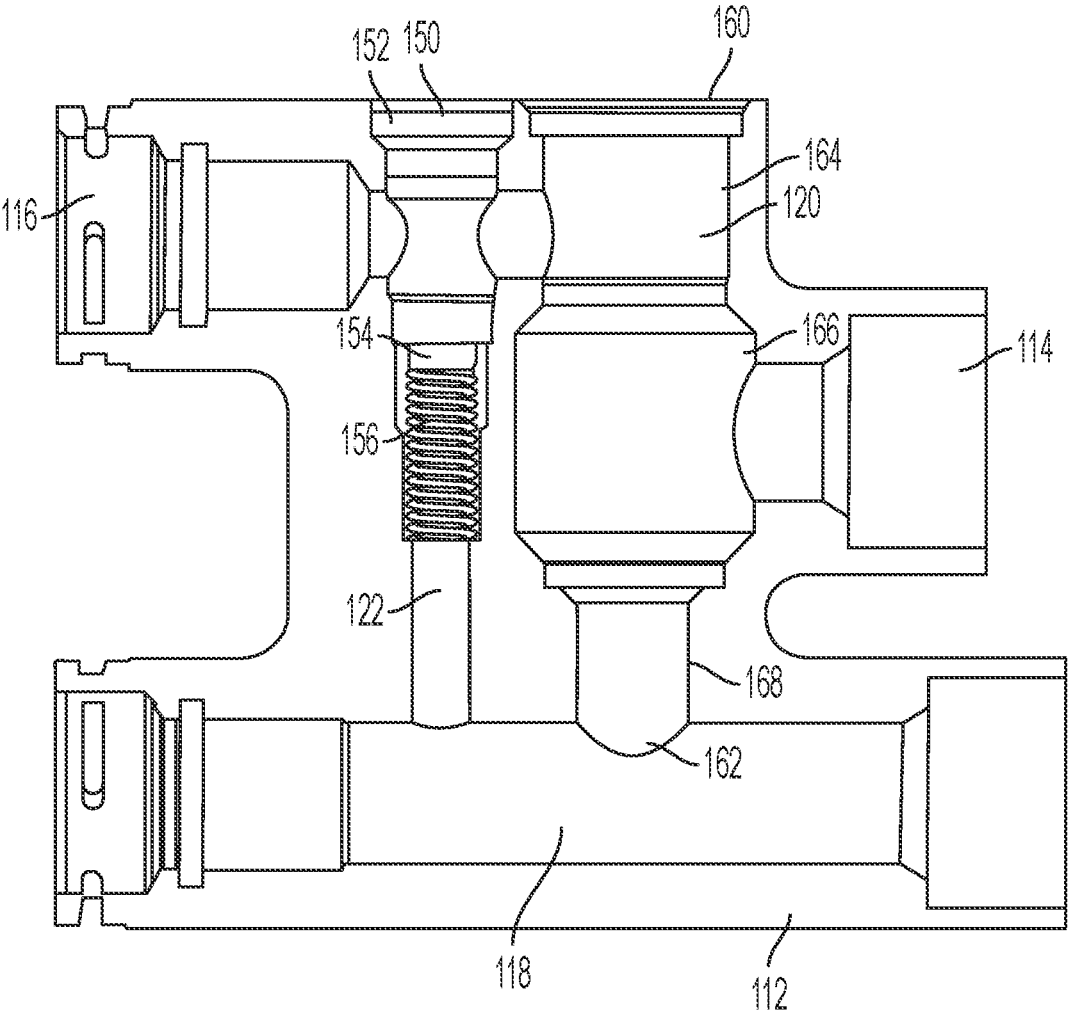
FIG. 3 is a sectional view illustrating a partially modified version of the OE cooler bypass manifold of FIG. 1, according to an embodiment.

FIG. 3 is a sectional view illustrating a partially modified version of the OE cooler bypass manifold 110 of FIG. 1, according to an embodiment. In an embodiment, the OE cooler bypass manifold 110 may be modified by removing the OE thermal bypass valve assembly 130 from the thermal valve bore 120 of the OE manifold body 112.

The thermal valve bore 120 of the OE manifold body 112 includes a first end 160 and a second end 162, and an outboard end section 164, an intermediate section 166 and an inboard end section 168 disposed along a length of the bore 120. The outboard end section 164 is adjacent to the first end 160 and the inboard end section 168 is adjacent to the second end 162.

Figure 4:
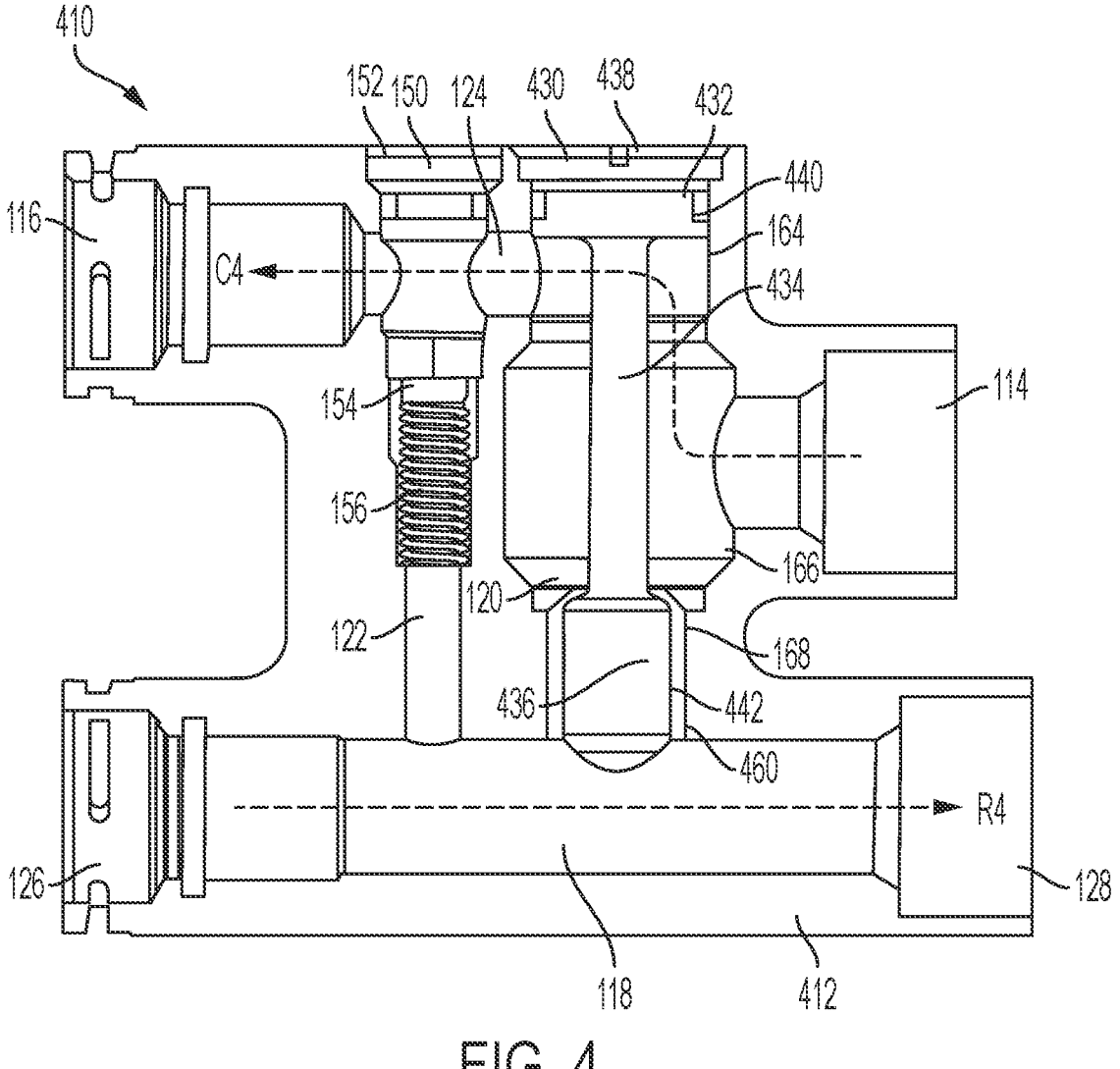
FIG. 4 is a sectional view illustrating a modified cooler bypass assembly according to an embodiment.

FIG. 4 is a sectional view illustrating a modified cooler bypass manifold 410 according to an embodiment. The modified cooler bypass manifold 410 may be a modified version of the OE cooler bypass manifold 110. The modified cooler bypass manifold 410 may include a modified manifold body 412 and the OE pressure bypass valve assembly 150 installed in the pressure valve bore 122. The modified manifold body 412 may be substantially the same as the OE manifold body 112 except that the modified manifold body 412 may include a threaded portion 460 in the thermal valve bore 120. In an embodiment, the threaded portion 460 may be disposed along the inboard end section 168.

According to an embodiment, the modified cooler bypass manifold 410 may further include a plug 430 installed in the thermal valve bore 120 of the modified manifold body 412. The plug 430 is configured to substantially prevent fluid communication between the thermal valve bore 120 and the return conduit 118. The plug 430 is also sized and shaped such that the inlet conduit 114, the thermal valve bore 120 and the intermediate conduit 124 are disposed in fluid communication with one another. In this manner, ATF received at the modified cooler bypass manifold 410 may flow into the inlet conduit 114, the thermal valve bore 120, the intermediate conduit 124, the pressure valve bore 122 and the outlet conduit 116 to the cooler as indicated by cooler flow path C4 in FIG. 4. ATF may be returned to the transmission case via the return conduit 118, as indicated by return flow path R4.

According to an embodiment, the plug 430 may be formed as a one-piece construction. The plug 430 may include a head 432, a rod 434 and a foot 436. The head 432 may include a tool interface 438, for example, at an outer, axial-facing surface. The head 432 may also include a circumferential groove 440 configured to receive an O-ring. The rod 434 may extend from the head 432. In an embodiment, the head 432 has a first width or diameter and the rod 434 has a second width or diameter which is less than the first width. The foot 436 may extend from the rod 434 at an opposite end from the head 432. The foot 436 may have a third width or diameter which is greater than the second width. The plug 430 may also include a threaded portion 442 configured for threaded engagement with the threaded portion 460 of the thermal valve bore 120. In an embodiment, the threaded portion 442 of the plug 430 may be disposed along the foot 436.

The plug 430 is configured for installation in the thermal valve bore 120. In an embodiment, the threaded portion 442 of the plug 430, for example at the foot 436, may be engaged with the corresponding threaded portion 460 of at the inboard end section 168 of the thermal valve bore 120. In an embodiment, the head 432 may be received in the outboard end section 164 and may seal the first end 160 of the bore 120. Such a seal may be provided, for example, by a close fit between head 432 and the outboard end section 164, and/or by an O-ring installed in the groove 440 configured to bear against the thermal valve bore 120. In an embodiment, the width or diameter of the rod 434 is less than a width or diameter of the thermal valve bore 120 such that ATF may flow through the thermal valve bore 120 and around the rod 434.

The foot 436, by way of the mating threaded engagement, may be configured for close contact with the inboard end section 168 of the thermal valve bore 120. Thus, ATF received in the bore 120 may be substantially prevented from flowing to the return conduit 118 through the inboard end section 168.

Figure 5:
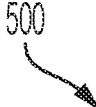
FIG. 5 is a block diagram illustrating an example of a method for modifying an OE cooler bypass manifold according to an embodiment.
Figure 5:
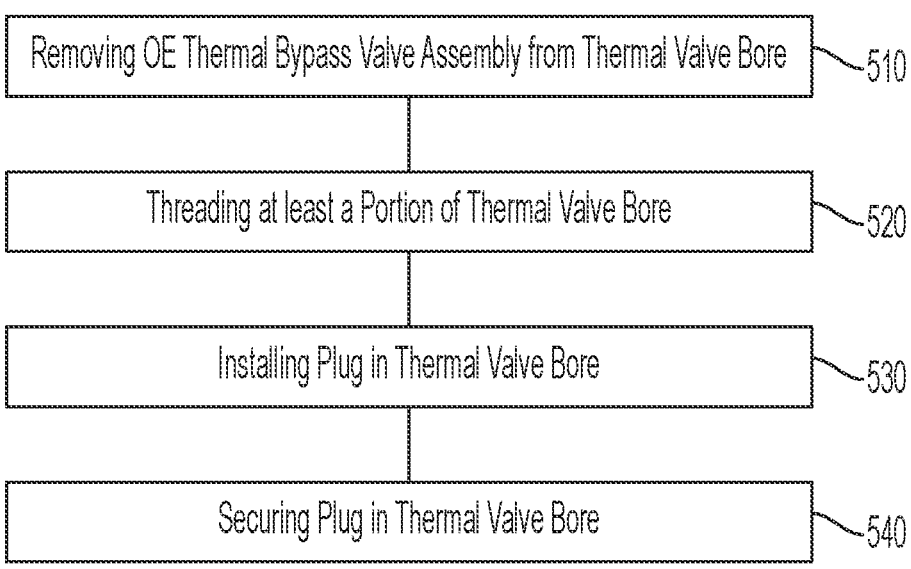

FIG. 5 is a block diagram illustrating an example of a method 500 for modifying an OE cooler bypass manifold, according to an embodiment. The OE cooler bypass manifold 110 includes the OE manifold body 112, the inlet conduit 114, the outlet conduit 116, the return conduit 118, the thermal valve bore 120, the pressure valve bore 122 and the intermediate conduit 124. The OE cooler bypass manifold 110 further includes the OE thermal bypass valve assembly 130 disposed in the thermal valve bore 120 and the OE pressure bypass valve assembly 150 disposed in the pressure valve bore 122.

According to an embodiment, the method 500 may include, at 510, removing the OE thermal bypass valve assembly 130 from the thermal valve bore 120. The method may also include, at 520, threading at least a portion of the thermal valve bore 120. In an embodiment, the inboard end section 168 of the thermal valve bore 120 may be threaded. In an embodiment, the threads may be formed with a $7/16$"-14 tap. In an embodiment, the modified manifold body 412 may be formed by threading at least a portion of the thermal valve bore 120 of the OE manifold body 112.

At 530, the method may further include installing the plug 430 in the thermal valve bore 120. In an embodiment, the plug 430 may be received in the thermal valve bore 120 through the first end 160 of the thermal valve bore 120. In an embodiment, the plug 430 includes a threaded portion configured for threaded engagement with the threads of the thermal valve bore 120. For example, the foot 436 may include threaded portion 442.

In an embodiment, installing the plug 430 may include freely inserting the plug into the thermal valve bore 120 until the threaded portion 442 of the plug 430 contacts the threaded portion 460 of the thermal valve bore 120. Installing the plug 430 may further include rotating the plug 430 to further axially position the plug 430 in the thermal valve bore 120 by way of the threaded engagement between the threaded portions 442, 460. In an embodiment, the plug may be rotated by tool (not shown) engaged with the tool interface 438.

In an embodiment, the method may optionally include, at 540, securing the plug 430 in the thermal valve bore 120. The plug 430 may be secured, for example, by using a thread-lock product or disrupting material immediately adjacent to an externally exposed periphery of the head 432 to substantially preclude rotational and/or axial movement of the plug 430 in a removal direction.

Accordingly, in the embodiments above, the modified cooler bypass manifold 410 may be formed, for example, by removing an OE thermal bypass valve assembly 130 from a thermal valve bore 120 of OE manifold body, threading a portion of the thermal valve bore 120, and installing a plug 430. The plug 430 may be sized and shaped to direct ATF flow through the manifold body 412 to the cooler.

According to an embodiment, a kit for modifying the OE cooler bypass manifold 110 may include the plug 430. In an embodiment, the kit may also include an O-ring for installation in the groove 440 of the plug 430. In an embodiment, the kit may further include a tap for threading the thermal valve bore 120. In an embodiment, the kit may further include a tool for engaging the tool interface 438 of the plug 430 to install the plug 430.

FIG. 6 is a sectional view illustrating another prior art OE cooler bypass manifold 610. The OE cooler bypass manifold 610 includes an OE manifold body 612, a first inlet conduit 614, a second inlet conduit 616, a first outlet conduit 618 and a second outlet conduit 620. The OE cooler bypass manifold further includes a valve bore 622 and an OE thermal bypass valve assembly 630 disposed in the valve bore 622. With the OE thermal bypass valve assembly 630 in a bypass position, ATF is received in the first inlet conduit 614 from the transmission case, flows through a portion of the valve bore 622, and is returned directly to the transmission case from the first outlet conduit 618, along direct return flow path D6.

The OE thermal bypass valve assembly 630 includes an OE end cap 632 and retaining ring, wax motor 634, thermally activated valve 636 and one or more valve springs 638. The OE thermal bypass valve assembly 630 can be positioned to allow ATF flow through the OE manifold body 612 to the cooler. In such a position, ATF is received in the first inlet conduit 614 from the transmission case and is discharged from the second outlet conduit 620 to flow to the cooler. ATF is received from the cooler in the second inlet conduit 616, flows through a portion of the valve bore 622, and is returned to the transmission case via the first outlet conduit 618.

Figure 7:
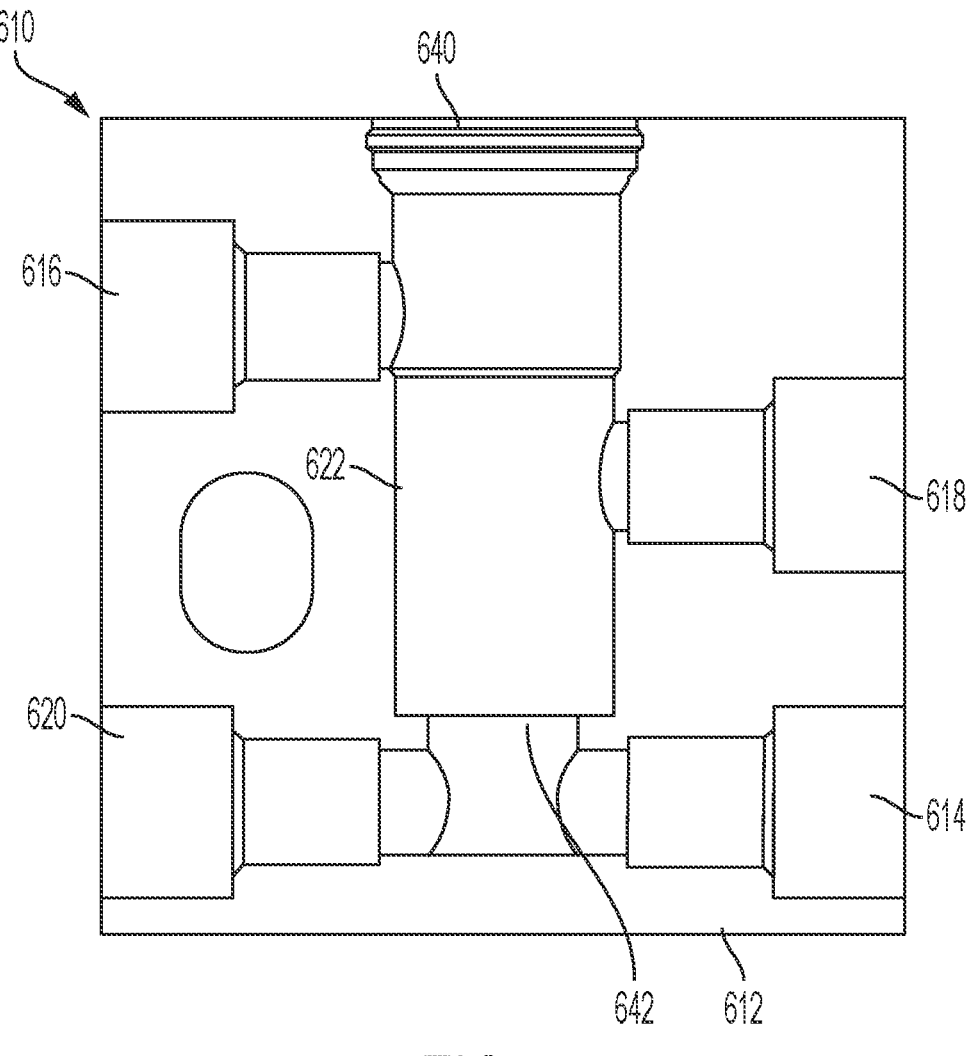
FIG. 7 is a sectional view illustrating a partially modified version of the OE cooler bypass manifold of FIG. 6.

FIG. 7 is a sectional view illustrating a partially modified version of the OE cooler bypass manifold 610. In particular, FIG. 7 illustrates the OE cooler bypass manifold 610 with the OE thermal bypass valve assembly 630 removed. The valve bore 622 includes a first end 640 and a second end 642. The first end 640 is open to a side of the OE manifold body 612. The second end 642 is disposed between, and connected to, the first inlet conduit 614 and the second outlet conduit 620.

Figure 8:
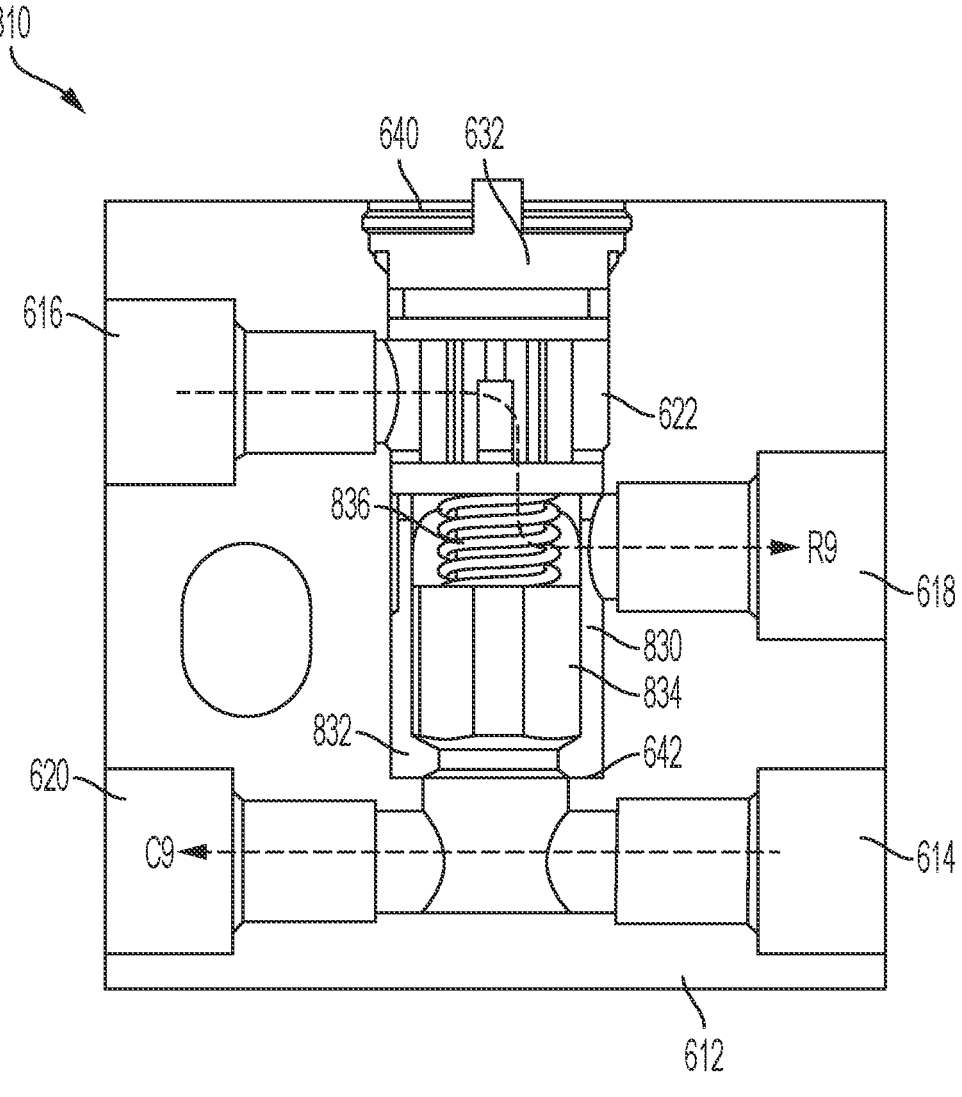
FIG. 8 is a sectional view illustrating a modified cooler bypass manifold according to an embodiment.

FIG. 8 is a sectional view illustrating a modified cooler bypass manifold 810 according to an embodiment. The modified cooler bypass manifold 810 may include the OE manifold body 612 and a pressure bypass valve assembly 830 installed in the valve bore 622.

In an embodiment, the pressure bypass valve assembly 830 may include a sleeve 832, a pressure activated valve 834 and a spring 836. The pressure bypass valve assembly 830 may be operably connected to the OE end cap and retaining ring 632. The OE end cap and retaining ring 632 may be operably connected to the OE manifold body to substantially close and seal the first end 640 of the valve bore 622. In this manner, the pressure bypass valve assembly 830 may also be retained in the valve bore 622 by the OE end cap and retaining ring 632.

In an embodiment, the sleeve 832 may be disposed in the valve bore 622 adjacent to the second end 642. The pressure activated valve 834 may be disposed within the sleeve and urged to a closed position by the spring 836. For example, the spring 836 may urge the pressure activated valve toward the second end 642 of the valve bore 622. In this manner, the pressure bypass valve assembly 830 may direct ATF from the first inlet conduit 614 to the second outlet conduit 620 for discharge to the cooler along cooler flow path C9 and may substantially prevent ATF from flowing into the valve bore 622 with the pressure activated valve 834 closed. ATF may return to the transmission case from the cooler via the second inlet conduit 616, the valve bore 622 and the first outlet conduit 618 along return flow path R9.

The pressure activated valve 834 may be open in response to an increased or relatively high ATF pressure. Such relatively high ATF pressure may result from restricted ATF flow in the cooler or between the modified bypass cooler manifold 810 and the cooler. Increased ATF pressure may cause the pressure bypass valve assembly 830 to operate. For example, relatively high ATF pressure may cause the pressure activated valve 834 to move within the valve bore 622 against a force from the spring 836, and away from the second end 642, to allow ATF to flow into the valve bore 822 and the sleeve 832. In this manner, the pressure bypass valve assembly 830 may direct ATF directly back to the transmission case, thereby bypassing the cooler.

Figures 9, 10:
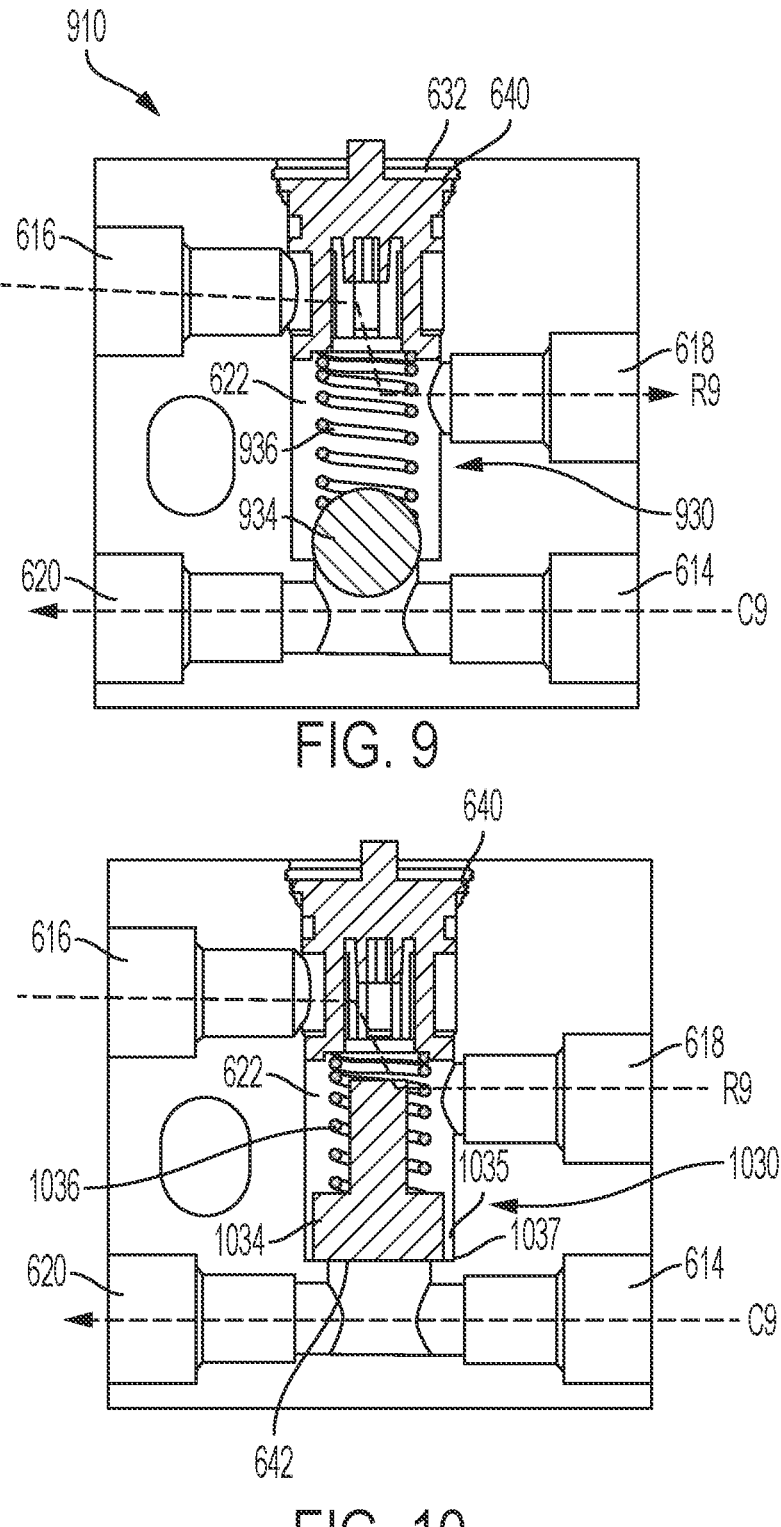
FIG. 9 is a sectional view illustrating a modified cooler bypass manifold according to an embodiment.
FIG. 10 is a sectional view illustrating a modified cooler bypass manifold according to an embodiment.

FIG. 9 illustrates another embodiment of a modified cooler bypass manifold 910. This embodiment is similar to that of FIG. 8, and may use the OE manifold body and a pressure bypass valve assembly 930 installed in the valve bore 622. In this embodiment, however, no sleeve is used. Rather, the pressure bypass valve assembly 930 includes a pressure activated check ball valve 934 and a spring 936. The pressure bypass valve assembly 930 may be operably connected to the OE end cap 632 and retaining ring, and the OE end cap 632 and retaining ring may be operably connected to the OE manifold 910 body to substantially close and seal the first end 640 of the valve bore 622. Alternately, a replacement end cap and a retaining member, such as a retaining ring can be used to retain the spring 936 and check ball 934 in place in the manifold 910.

As with the embodiment of FIG. 8, the pressure activated bypass valve assembly 930 is urged to a closed position by the spring 936 to direct ATF from the first inlet conduit 614 to the second outlet conduit 620 for discharge to the cooler along cooler flow path C9 and may substantially prevent ATF from flowing into the valve bore 622. ATF may return to the transmission case from the cooler via the second inlet conduit 616, the valve bore 622 and the first outlet conduit 618 along return flow path R9.

The pressure bypass valve assembly 930 may open in response to an increased or relatively high ATF pressure, in which case, the increased ATF pressure causes the pressure bypass valve assembly 930 to operate (open) to allow ATF to flow into the valve bore 622 to direct ATF directly back to the transmission case, thereby bypassing the cooler.

Referring to FIG. 10, another modified cooler bypass manifold 1010 is illustrated that is similar to that of FIG. 9, and may use the OE manifold body and a pressure bypass valve assembly 1030 installed in the valve bore 622. In this embodiment, no sleeve is used and the pressure bypass valve assembly 1030 serves as a pressure relief valve. The pressure bypass/relief assembly 1030 includes a plug 1034 and a spring 1036. The plug 1034 includes passages 1035 along a peripheral edge 1037 of the plug 1034 to, upon increased or relatively high ATF pressure, provide flow communication from the first inlet conduit 614, around the plug 1034 (along the passages 1035), into the valve bore 622, and return to the transmission through first outlet conduit 618. When the valve is closed (as by spring 1036 pressure), ingress into the valve bore 622 is prevented by the plug 1034 closing off the entrance to the valve bore 622 (by sealing off valve bore at second end 642), and ATF is directed from the first inlet conduit 614 to the second outlet conduit 620 for routing to the cooler along cooler flow path C9, preventing cooler bypass.

It will be appreciated by those skilled in the art that the passages 1035 that provide flow communication through the bypass/relief plug 1034 can be formed in the periphery 1037 of the plug 1034 or in the plug 1034 body, at a diameter beyond the opening from the second end 642 into the valve bore 622.

Figure 11:
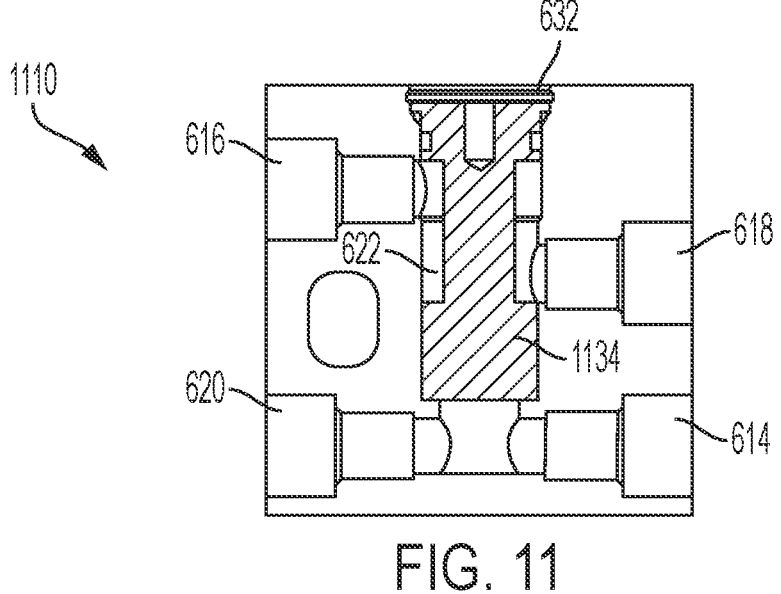
FIG. 11 is a sectional view illustrating a modified cooler bypass manifold according to an embodiment.
Figure 12:
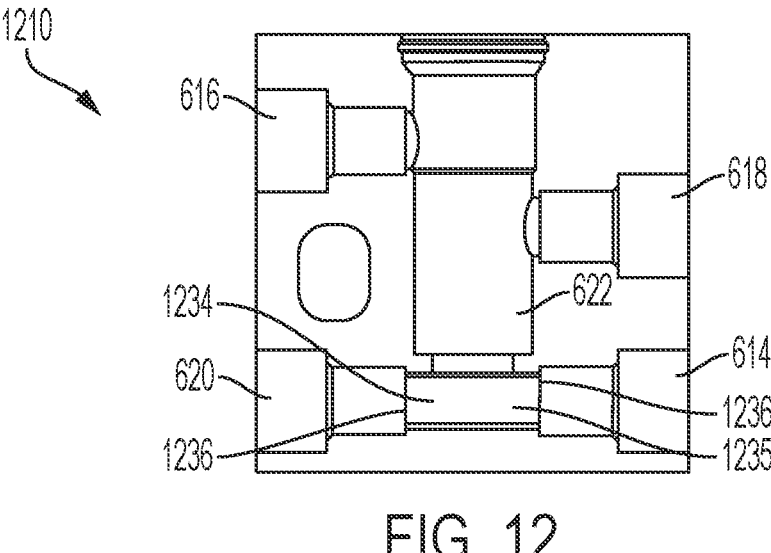
FIG. 12 is a sectional view illustrating a modified cooler bypass manifold according to an embodiment.
Figure 13:
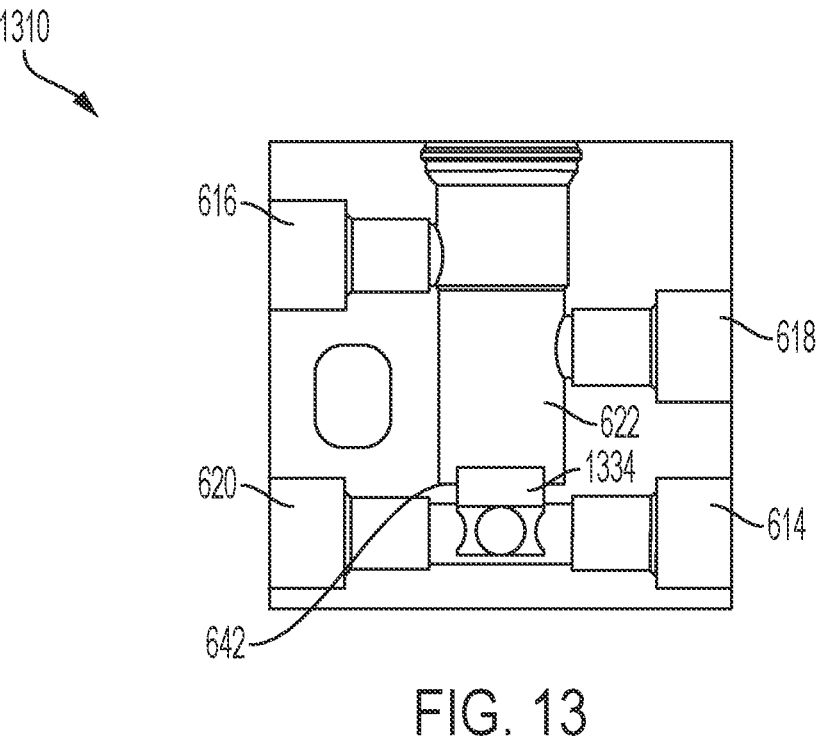
FIG. 13 is a sectional view illustrating a modified cooler bypass manifold according to an embodiment.

FIGS. 11, 12 and 13 illustrate embodiments in which a barrier is provided to prevent cooler bypass; as such, no pressure bypass is provided in these embodiments. That is, a barrier is provided between the flow path to the cooler C9 (i.e., into manifold through the first inlet conduit 614 and out through the second outlet conduit 620) and the flow path R9 that returns the ATF to the transmission (i.e., into manifold through the second inlet conduit 616, through the valve bore 622 and out through the first outlet conduit 618).

In the embodiment of FIG. 11, a plug 1134 is positioned in the bore 622 to eliminate the cooler bypass. The plug 1134 can be secured in place in a variety of ways, including using the OEM end cap 632, or using a replacement end cap that can be threaded in place, press fit or secured using a retaining ring. Other ways in which the plug 1134 can be secured in place will be understood by those skilled in the art.

In FIG. 12, a sleeve 1234 is inserted into the manifold 1210 body between the first inlet conduit 614 and the second outlet conduit 620. It is anticipated that the sleeve 1234 can be inserted into the manifold 1210 through either the first inlet conduit 614 or the second outlet conduit 620. The sleeve 1234 can be press fit into place. The sleeve 1234 is a flow through element and does not include an opening other than the bore 1235 between the ends 1236 of the sleeve 1234 so that no flow path is provided into the valve bore 622; that is flow into the valve bore 622 is eliminated.

Likewise, in FIG. 13 a barrier to flow into the valve bore 622 is provided by a plug 1334 that is positioned at the valve bore second end 642 to close off the cooler bypass (i.e., close off the flow path from first inlet conduit 614 through the valve bore 622 and out through first outlet conduit 618). It is anticipated that the plug 1334 can be inserted into the valve bore 622 through the end cap 632 and can be secured in place by the end cap 632 or can be press fit or secured in place using any of a variety of known methods.

Figure 14:
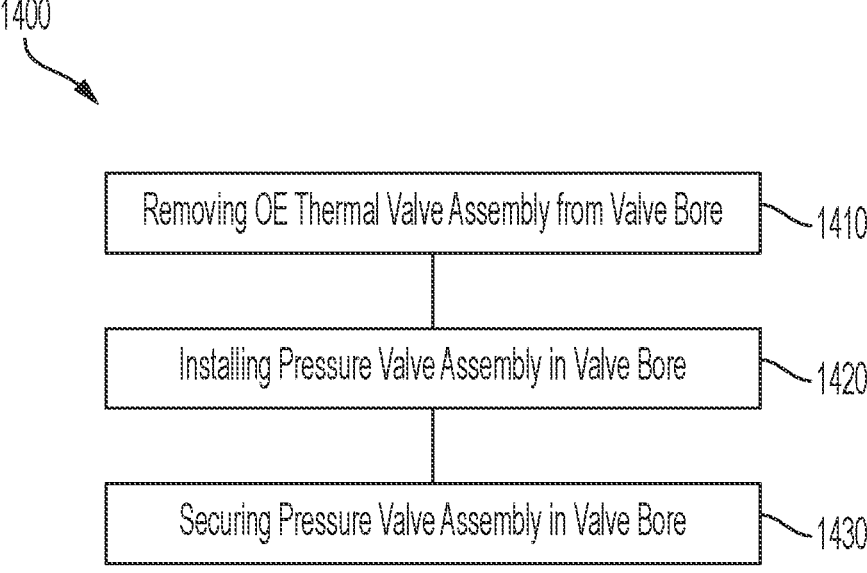
FIG. 14 is a block diagram illustrating an example of a method for modifying an OE cooler bypass manifold according to an embodiment.

FIG. 14 is a block diagram illustrating an example of a method 1400 for modifying an OE cooler bypass manifold according to an embodiment. The OE cooler bypass manifold 610 includes the OE manifold body 612, the first inlet conduit 614, the second inlet conduit 616, the first outlet conduit 618 and the second outlet conduit 620. The OE cooler bypass manifold further includes the valve bore 622 and the OE thermal bypass valve assembly 630 disposed in the valve bore 622. The OE thermal bypass valve assembly 630 includes the OE end cap 632 and retaining ring, the wax motor 634, the thermally activated valve 636 and the one or more valve springs 638.

According to an embodiment, the method 1400 may include, at 1410, removing the OE thermal bypass valve assembly 640 from the valve bore 622. At 1420, the method may include installing the pressure bypass valve assembly 830 in the valve bore 622 of the OE manifold body 612. In an embodiment, installing the pressure bypass valve assembly 830 may include disposing the sleeve 832 adjacent to the second end 642 of the valve bore 622 and disposing the pressure activated valve 834 at least partially within the sleeve 832. Installing the pressure bypass valve assembly 830 may also include installing the spring 836 to urge the pressure activated valve 834 toward the second end 642.

At 1430, the method may include securing the pressure bypass valve assembly 830 in the valve bore 622. In an embodiment, securing the pressure bypass valve assembly 830 may include operably connecting the OE end cap and retaining ring 632 to the pressure bypass valve assembly 830 and the OE manifold body 612.

In an embodiment, a kit for modifying the OE cooler bypass manifold 610 may include the pressure bypass valve assembly 830, 930, 1030, or the plug 1130, 1230, 1330.

According to the embodiments herein, an OE cooler bypass manifold may be modified in a consistent, effective and reproducible manner and the modifications may be relatively inexpensive. The modified OE cooler bypass manifold of the present embodiments may allow for continuous ATF flow to the cooler during normal operation. In this manner, ATF may be maintained at a suitable temperature.

It is understood that the features described with respect to any of the embodiments above may be implemented, used together with, or replace features described in any of the other embodiments above. It is also understood that description of some features may be omitted in some embodiments, where similar or identical features are discussed in other embodiments.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular. In addition, it is understood that terminology referring to directions or relative orientations, such as, but not limited to, "upper" "lower" "raised" "lowered" "top" "bottom" "above" "below" "alongside" "left" and "right" are used for purposes of example and do not limit the scope of the subject matter described herein to such orientations or relative positioning.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A modified cooler bypass manifold comprising:
a manifold body comprising an inlet conduit, an outlet conduit, a return conduit, a thermal valve bore, a pressure valve bore and an intermediate conduit, the thermal valve bore having an inboard end section and an outboard end section, wherein the inboard end section has a threaded portion fluidly coupling the inlet conduit to the return conduit, and wherein the inlet conduit is fluidly coupled to the outlet conduit via the outboard end section of the thermal valve bore; and
a plug threadedly engaged with the threaded portion of the inboard end section of the thermal valve bore, wherein the thermal valve bore is configured to receive automatic transmission fluid from the inlet conduit, wherein the plug is configured to direct the automatic transmission fluid to the pressure valve bore via the intermediate conduit, and wherein the threaded engagement between the plug and the threaded portion of the thermal valve bore is configured to prevent the automatic transmission fluid from flowing through the threaded portion of the inboard end section between the inboard end section of the thermal valve bore and the return conduit.

2. The modified cooler bypass manifold of claim 1, wherein the plug is a one-piece construction.

3. The modified cooler bypass manifold of claim 1, further comprising an OE pressure bypass valve assembly disposed in the pressure valve bore.

4. A method of modifying an OE cooler bypass manifold, the OE cooler bypass manifold comprising an OE manifold body, an inlet conduit, an outlet conduit, a return conduit, a thermal valve bore having an inboard end section and an outboard end section, the inlet conduit being fluidly coupled to the outlet conduit via the outboard end section of the thermal valve bore, and the inlet conduit being fluidly coupled to the return conduit via the inboard end section of the thermal valve bore, a pressure valve bore, an intermediate conduit, an OE thermal bypass valve assembly disposed in the thermal valve bore and an OE pressure bypass valve assembly disposed in the pressure valve bore, the method comprising:
removing the OE thermal bypass valve assembly from the thermal valve bore;
threading at least a portion of the thermal valve bore at the inboard end section fluidly coupling the inlet conduit to the return conduit, and; and
threadingly engaging a plug with the threaded portion of the inboard end section of the thermal valve bore to thereby prevent fluid communication through the threaded portion of the inboard end section between the inboard end section of the thermal valve bore and the return conduit.

5. The method of claim 4, wherein the plug is a one-piece construction.

6. The method of claim 4, wherein the thermal valve bore is configured to receive automatic transmission fluid from the inlet conduit, and the plug is configured to direct the automatic transmission fluid to the pressure valve bore via the intermediate conduit, and to isolate automatic transmission fluid from the return conduit.

7. A kit for modifying an OE cooler bypass manifold, the kit comprising:
A plug formed as a one-piece construction, the plug comprising a head, a rod, a foot and a threaded portion formed on the foot, wherein the plug is configured for installation in a thermal valve bore of the OE cooler bypass manifold with the foot being inserted into the thermal valve bore before the rod and the head, and for threadedly engaging a threaded portion of the thermal valve bore with threads of the foot so as to prevent fluid communication through the threaded portion of the thermal valve bore.

8. A modified cooler bypass manifold comprising:

an OE manifold body, a first inlet conduit, a second inlet conduit, a first outlet conduit, a second outlet conduit and a valve bore;

a pressure bypass valve assembly disposed in the valve bore;

an OE end cap and retaining ring disposed in the valve bore and operably connected to the pressure bypass valve assembly and the OE manifold body;

a sleeve disposed in the valve bore;

a pressure activated valve at least partially disposed within the sleeve such that the sleeve is radially between the OE manifold body and the pressure activated valve; and one or more valve springs to urge the pressure activated valve toward a second end of the valve bore to thereby prevent fluid communication through the second end of the valve bore, wherein the pressure bypass valve assembly is operable to direct automatic transmission fluid received in the first inlet conduit to the second outlet conduit or to the valve bore and first outlet conduit based on a fluid pressure of the automatic transmission fluid regardless of the temperature for the fluid.

9. A method of modifying an OE cooler bypass manifold for fluidly communicating automatic transmission fluid, the OE cooler bypass manifold comprising an OE manifold body, a first inlet conduit, a second inlet conduit, a first outlet conduit, a second outlet conduit a valve bore and an OE thermal bypass valve assembly disposed in the valve bore, the method comprising:

removing an OE end cap and retaining ring securing the OE thermal bypass valve assembly;

removing the OE thermal bypass valve assembly from the valve bore, wherein the OE thermal bypass valve is operable to provide fluid communication from the first inlet conduit to the first outlet conduit via the valve bore depending on a temperature of the automatic transmission fluid;

installing a pressure bypass valve assembly in the valve bore in place of the OE thermal bypass valve assembly to thereby prevent fluid communication from the first inlet conduit to the first outlet conduit via the valve bore regardless of the temperature for the automatic transmission fluid; and securing the pressure bypass valve assembly in the valve bore by operably connecting the OE end cap and retaining ring to the pressure bypass valve assembly and the OE manifold body, wherein the OE end cap and retaining ring is disposed at least partially in the valve bore.

10. A kit for modifying an OE cooler bypass manifold, the kit comprising:

a pressure bypass valve assembly comprising a sleeve, a pressure activated valve, and a spring, wherein the pressure bypass valve assembly is configured for installation in the valve bore such that the sleeve is radially between the valve bore and the pressure activated valve, and wherein the pressure activated valve is moveable within the sleeve to prevent fluid communication through the valve bore regardless of the temperature for the fluid.

* * * * *